United States Patent [19]

Okabayashi

[11] Patent Number: 5,788,171
[45] Date of Patent: Aug. 4, 1998

[54] METHOD AND APPARATUS FOR DETECTING RESIDUAL BOBBIN THREAD IN A SEWING MACHINE

[75] Inventor: Mitumasa Okabayashi, Tokyo, Japan

[73] Assignee: Juki Corporation, Tokyo, Japan

[21] Appl. No.: 582,614

[22] Filed: Jan. 3, 1996

[30] Foreign Application Priority Data

Jul. 12, 1995 [JP] Japan ................ 7-175293

[51] Int. Cl.⁶ .............. B65H 63/00; D05B 51/00; H02K 41/00
[52] U.S. Cl. .............. 242/49; 112/278; 242/22; 318/135
[58] Field of Search .............. 242/49, 20, 22; 318/135; 112/273, 278

[56] References Cited

U.S. PATENT DOCUMENTS

| | | | |
|---|---|---|---|
| 2,808,795 | 10/1957 | Wortham | 112/186 |
| 3,125,973 | 3/1964 | Bemerus et al. | 112/186 |
| 3,129,680 | 4/1964 | Doerner | 242/22 |
| 3,509,840 | 5/1970 | Rovin | 112/181 |
| 4,002,130 | 1/1977 | Rovin et al. | 112/180 |
| 4,117,789 | 10/1978 | Rovin et al. | 112/181 |
| 4,196,685 | 4/1980 | Tamura | 112/273 |
| 4,244,313 | 1/1981 | Rovin et al. | 112/279 |
| 4,681,050 | 7/1987 | Kosmas | 112/278 |
| 4,983,893 | 1/1991 | Miyashita et al. | 318/135 |
| 5,078,068 | 1/1992 | Hager et al. | 112/262.1 |
| 5,143,004 | 9/1992 | Mardix et al. | 112/186 |
| 5,339,758 | 8/1994 | Fujita | 112/278 |
| 5,350,127 | 9/1994 | Arnold et al. | 242/20 |
| 5,528,090 | 6/1996 | Satomi | 318/135 X |
| 5,584,257 | 12/1996 | Nakamura et al. | 242/20 X |

FOREIGN PATENT DOCUMENTS

63-136591  9/1988  Japan.

*Primary Examiner*—Michael Mansen
*Attorney, Agent, or Firm*—Morgan, Lewis & Bockius LLP

[57] ABSTRACT

An apparatus is disclosed which detects the residual quantity of bobbin thread on a sewing machine bobbin when the shuttle containing the bobbin is located at a specific phase position. The apparatus includes a detection rod driven by a solenoid so that one end contacts the outer periphery of the residual bobbin thread. A sensor signals when the amount of residual thread is less than a predetermined quantity.

7 Claims, 9 Drawing Sheets

METHOD AND APPARATUS FOR DETECTING RESIDUAL BOBBIN THREAD IN A SEWING MACHINE

BACKGROUND OF THE INVENTION

1. Filed of the Invention

The present invention relates to a detection apparatus for a machine provided with an actuator acting in response to an electric signal, and more particularly to an apparatus for detecting the residual quantity of bobbin thread for a sewing machine, using a detection rod for detecting the reduced quantity of bobbin thread before a complete absence of bobbin thread on a bobbin to prevent partially sewn products from being remade or prevent inferior products from being manufactured.

2. Description of the Related Art

In an apparatus for detecting the residual quantity of bobbin thread, thread cutters and thread cleaners in sewing machines, or printer hammers in printers, actuators such as solenoids are actuated to operate these apparatus according to electric signals.

Japanese Unexamined Utility Model Publication No. Sho. 63-136591, for example, discloses an apparatus for detecting the residual quantity of bobbin thread for a sewing machine.

In the apparatus for detecting the residual quantity of bobbin thread as proposed above, actuator means such as a rotary solenoid operates to reciprocate a detection rod in such a way that its leading end is made to contact the outer periphery of the bobbin thread wound on a bobbin within a shuttle when a sewing machine stops at a predetermined position after the sewing operation is completed, and then the rod returning. If the residual quantity of the bobbin thread wound on the bobbin is large enough to complete the sewing operation then no signal will be generated because the distance covered by the detection rod is short. However, if the residual quantity of the bobbin thread is below a threshold level indicating that the bobbin thread wound on the bobbin has been consumed the outer peripheral diameter of the bobbin thread thus wound decreases and consequently the distance covered by the detection rod gradually increases. When the movement of the detection rod reaches the limit of the distance, a signal for detecting consumed bobbin thread is ultimately issued to inform the operator of the necessity of a fresh supply of bobbin thread.

When the mechanism is operated by means of the actuator, it is necessary to detect whether the mechanism has surely been actuated. However, the provision of a switch for detecting the actuation of a mechanical part is hardly possible in the case of a mechanism to be installed in a small space within the thread cutter or the thread clearer in a sewing machine, or the printer hammer, and this has made it imperative to provide a limit switch at each of the positions to which the moving element of the actuator is designed to move. Therefore, there arise problems including making it troublesome incorporating an actuator and wiring it, increasing the number of parts and so forth.

Moreover, the apparatus for detecting the residual quantity of bobbin thread in the sewing machine is unable to detect the residual quantity of the bobbin thread unless the sewing machine stops at a predetermined position, after completion of the sewing operation, besides the rotary solenoid. A electromagnetic plunger is used as the actuator means for operating the detection rod. The actuator means operates over small range, and the detection rod is actuated by amplifying the magnitude of its operation using a linking mechanism.

A drawback to rotary solenoid as well as the electromagnet plunger is their characteristic that their strength is weakest at the start of their operation and increases substantially nears its termination. Therefore, the uniform winding of the bobbin thread wound on the bobbin is interrupted when the detection rod contacts the bobbin thread. The result is that the bobbin thread on the outer circumference may be sandwiched between the bobbin threads previously wound and, therefore, deformed. When the bobbin thread in that section is released, the tension of the bobbin thread is temporarily increased, thus disturbing the seam of the sewn product. In the worst case scenario, the bobbin thread cut by the collision with the detection rod. In order to prevent these harmful effects, contacting force of the detection rod with the bobbin thread should be lessened by placing an elastic member, such as a spring, therebetween. The bobbin thread protective measure suggested makes the structure of the actuator means more complicated and tends to increase the mass of the actuating member, necessitating the use of larger electromagnets.

A Hall element and a magnetic resistance element are used to detect the forward/backward movement of the detection rod, requiring a permanent magnet fitted to the detection rod. This is also problematic in that the structure of the actuator means is again more complicated and the mass of the actuating member increases.

SUMMARY OF THE INVENTION

An object of the present invention is to solve the above enumerated problems by providing a simply constructed detection apparatus for detecting the movement of the moving element of an thereby detecting the operating condition of a mechanism caused by an actuator.

Another object of the present invention is to provide an apparatus for detecting the residual quantity of bobbin thread for a sewing machine and also capable of measuring the residual quantity of bobbin thread during operation or non-operation of the sewing machine and as in small in size, lightweight and capable of protecting the bobbin thread.

Still another object of the present invention is to provide an apparatus for detecting the residual quantity of bobbin thread for a sewing machine without adding to a detection rod itself an element for detecting the position of the detection rod and such an apparatus therefor as is small in size, lightweight and usable for protecting the bobbin thread and for accurately detecting the residual quantity of bobbin thread.

To achieve the above objects, a first aspect of the present invention provides an apparatus for detecting the residual quantity of bobbin thread for a sewing machine when a shuttle is located at a specific phase position, the shuttle containing a bobbin on which the bobbin thread of the sewing machine is wound, the apparatus including: a detection rod having one end contacting the outer periphery of the bobbin thread wound on the bobbin to measure the residual quantity of the bobbin thread; a movable coil type actuator for moving the detection rod by transforming electrical energy to mechanical energy; and supplying means for supplying current to the movable coil type actuator to move the detection rod.

A second aspect of the invention provides an apparatus for detecting the residual quantity of bobbin thread for a sewing machine when a shuttle is located at a specific phase position, the shuttle containing a bobbin on which the bobbin thread of the sewing machine is wound, the apparatus including: a magnet generating magnetic fields having a first pole-face side and a second pole-face side; an iron core facing the first pole-face side of the magnet; a yoke for magnetically coupling the second pole-face side of the magnet to the iron core; a movable coil type actuator positioned in a gap between the magnet and the iron core, including coils of conductors wound around the iron core to supply electricity, and being freely slidable on the outer periphery of the iron core in a direction parallel to the first pole-face side of the magnet; a detection rod driven when force acts thereon as the movable coil type actuator slides, the detection rod having one end in contact with the outer periphery of the bobbin thread wound on the bobbin to measure the residual quantity of the bobbin thread; and supplying means for supplying current to the coils to let the coil type actuator have thrust.

A third aspect of the invention provides the apparatus according to one of the first or second aspect, wherein the supplying means supplies: forward current for giving the coils thrust in a direction in which the coils forwardly move; and backward current for giving the coils thrust in a direction in which the coils backwardly move.

A fourth aspect of the invention provides the apparatus according to the first aspect, further including: controlling means for controlling the thrust of the movable coil type actuator by intermittently stopping current from the supplying means.

A fifth aspect of the invention provides an apparatus for detecting the residual quantity of bobbin thread for a sewing machine when a shuttle is located at a specific phase position, the shuttle containing a bobbin on which the bobbin thread of the sewing machine is wound, the apparatus including: a detection rod having one end contacting the outer periphery of the bobbin thread wound on the bobbin to measure the residual quantity of the bobbin thread; an actuator for moving the detection rod by transforming electrical energy to mechanical energy; supplying means for supplying current to the actuator to move the detection rod; and sensor means for discriminating at least one of the cases where the bobbin thread is present or absent and where the forward/backward movement of the actuator by detecting the oscillating wave generated after the actuator and the detection rod slide and collide with the bobbin thread.

A sixth aspect of the invention provides an apparatus for detecting the residual quantity of bobbin thread for a sewing machine when a shuttle is located at a specific phase position, the shuttle containing a bobbin on which the bobbin thread of the sewing machine is wound, the apparatus including: a detection rod having one end contact the outer periphery of the bobbin thread wound onto the bobbin to measure the residual quantity of the bobbin thread; an actuator for moving the detection rod by transforming electrical energy to mechanical energy; supplying means for supplying current to the actuator to move the detection rod; and sensor means for discriminating at least one of the cases where the bobbin thread is present or absent and where the forward/backward movement of the actuator by analyzing the oscillating wave frequency which is generated after the actuator and the detection rod slide and collide with the bobbin thread is detected.

A seventh aspect of the invention provides a detection apparatus including: an actuator having a moving element capable of moving to a first position and a second position, and mating members which are each provided at the first and second position and capable of mating with the moving element at each position, the actuator being energized or deenergized in response to an electric signal to move the moving element to the first or second position until the moving element mates with the mating member; an ultrasonic sensor placed close to the actuator, for receiving sound resulting from the collision of the moving element with the mating member; and detecting means for detecting the movement of the moving element to the first or second position according the result detected by the ultrasonic sensor.

According to the first aspect, the apparatus for detecting the residual quantity of bobbin thread for a sewing machine when the shuttle (regardless of whether or not it is at a standstill or rotating) is located at a specific phase position (where the detection rod is moved forward via the opening of the shuttle from the standstill position to examine the residual quantity of the bobbin thread wound on the bobbin before being moved back) is provided with the means for supplying current to the movable coil type actuator for transforming electric energy to mechanical energy. The detection rod is moved forward via the opening of the shuttle and caused to contact the outer periphery of the bobbin thread wound on the bobbin, so that the residual quantity of the bobbin thread can be detected, depending on the thickness of the bobbin thread wound on the bobbin. Therefore, the detection of the residual quantity of the bobbin thread based on the quantity of the forward movement of the detection rod is made possible even during the sewing machine is at a standstill or performing the sewing operation.

According to the second aspect, the apparatus for detecting the residual quantity of bobbin thread for a sewing machine when the shuttle is located at a specific phase position to examine the residual quantity of the bobbin thread wound on the bobbin uses the movable coil type actuator for transforming electric energy to mechanical energy. On the assumption that uniform magnetic fields are applied from permanent magnets or electromagnets with respect to a span in which the coil is movable within the movable coil type actuator, thrust is proportional to the product of the magnetic flux density and the current flowing through the coil according to the Fleming's left-hand rule. Therefore, a constant thrust against a long stroke is structurally obtainable in comparison with a rotary solenoid or a plunger electromagnet.

Of the aforementioned means, those movable are the coil assembly and the detection rod serving as the movable coil type actuator, whereby the mechanism can be made simple, small-sized and lightweight. While the bobbin thread is less affected by the detection rod, the residual quantity of the bobbin thread becomes detectable quickly and accurately.

According to the third aspect, it is possible to switch thrust acting on the coil from the forward direction to the backward direction, depending on the direction in which the current flows through the coil since the Fleming's left-hand rule is intended for vector calculation.

According to the fourth aspect, the force of making the detection rod collide with the bobbin thread wound on the bobbin and the speed of the detection rod can be regulated by lowering the mean current value by causing the current to flow intermittently, and restricting the thrust since the thrust thus generated is proportional to the current flowing through the coil.

According to the fifth aspect, the actuator and the detection rod immediately collide with the sensor on both sides and the solid wall or the bobbin when they slide in one body, thus generating the oscillating wave. The oscillating wave is received by the oscillating-wave detection means and compared with a preset value in terms of size, whereby the presence or absence of the residual quantity of bobbin thread is detected. Moreover, the forward and backward movements of the actuator and the detection rod are monitored. More specifically, as signal levels of the following oscillating waves differ:

(a) oscillating wave when the actuator and the detection rod move forward and hit against the front sensor and the front wall;

(b) oscillating wave when the actuator and the detection rod move forward and hit against the bobbin thread; and (c) oscillating wave when the actuator and the detection rod reset and hit against the rear wall, these signals are received by the oscillating-wave detection means to make certain of the presence or absence of the residual bobbin thread and whether or not the forward and backward movements of the moving elements have properly been carried out by comparing, in terms of size, the measured values with preset values at which it is decided whether the bobbin thread is present or absent and whether or not the forward and backward movements of the actuator and the detection rod are properly carried out.

According to the sixth aspect, the actuator and the detection rod immediately collide with the sensor on both sides and the solid wall or the bobbin when they slide in one body, thus generating the oscillating wave. More specifically, as frequencies of the following oscillating waves differ:

(a) oscillating wave when the actuator and the detection rod move forward and hit against the front sensor and the front wall;

(b) oscillating wave when the actuator and the detection rod move forward and hit against the bobbin thread; and (c) oscillating wave when the actuator and the detection rod reset and hit against the rear wall, these signals are received by the oscillating-wave detection means to analyze the frequencies of the signals through FFT (Fast Fourier Transform), for example. By discriminating the oscillating wave thus detected to see if it is a signal wave formed in predetermined condition, whether the bobbin thread is present or absent, or otherwise whether the forward.backward movement of the coil assembly has properly been carried out.

According to the seventh, the ultra sonic sensor detects the sound generated when the moving element of the actuator hits against one or the other position (the front and rear walls of the coil) of the mating member, whereby the operation of the moving element, that is, the normal operation of the mechanism actuated by the actuator can be detected.

DETAILED DESCRIPTION OF THE PREFERRED EMBODIMENTS

In FIGS. 1(A) through 11 inclusive, reference numeral 1 designates a bearing for a detection rod; 2a, 2b, permanent magnets for generating uniform magnetic fields within a span in which a coil 7b is movable as will be described in more detail; 3a, a gap as the space between the permanent magnet 2a and an iron core 4 which will be described later; 3b, a gap as the space between the permanent magnet 2b and the iron core 4; and 4, the iron core in parallel to the permanent magnets 2a and 2b, the permanent magnets 2a and 2b, each having the same magnetic-pole-face equally facing the iron core 4.

Further, reference numerals 5a, 5b each designate return springs for urging a coil assembly 7 to the right end of FIG. 1 as will be described later; 6, a detection rod with one end as what is driven when force resulting from the sliding of the coil assembly 7 acts thereon and the other end as what is moved so that it contacts the outer peripheral face of the bobbin thread wound on a bobbin via a shuttle when the coil assembly 7 is moved; and 7, the coil assembly is slidable on the iron core 4, the coil assembly 7 including a coil bobbin 7a for winding a coil through which current flows and the coil 7b to which the linear or arcuate thrust based on the operating principle of a linear d.c. current is applied when electricity is supplied.

Further, reference numeral 8 designates a pressure sensor for sensing pressure by making use of resistance variation, the variation of a piezoelectric element or electric capacitance and the like; and 9, a lower guide rod which is secured to a yoke 10a which will be described later and performs the role of guiding the movement of the coil assembly 7.

Further, reference numeral 10a designates a yoke in contact with the side of the iron core 4; and 10b, a yoke in contact with the second pole-face side of the permanent magnet and the side of the yoke 10a, these constituting not only the path of magnetic flux departing from and returning to the permanent magnet but also the outer frame of the apparatus for detecting the residual quantity of bobbin thread.

Figure 1A:
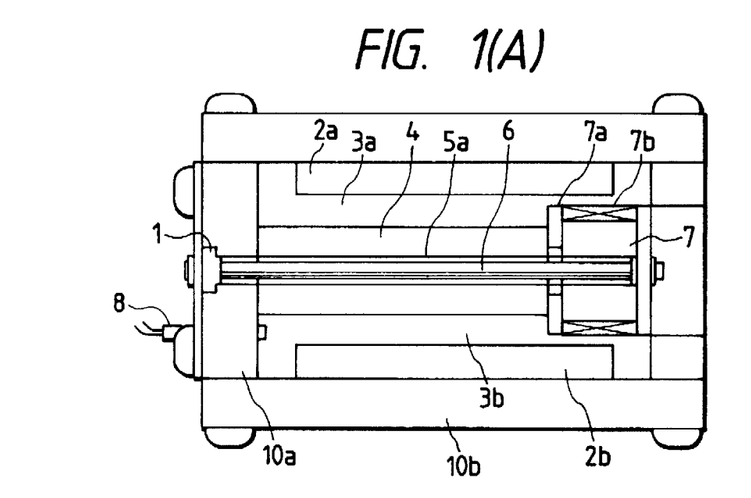
FIG. 1(A) is a horizontal sectional view of an apparatus for detecting the residual quantity of bobbin thread embodying the present invention.

Of these components, the permanent magnets 2a, 2b, the gaps 3a, 3b, the iron core 4, the coil assembly 7 including the coil bobbin 7a and the coil 7b, and the yokes 10a, 10b constitute the movable coil type actuator of FIG. 1 according to one embodiment of the present invention.

Figure 3A:
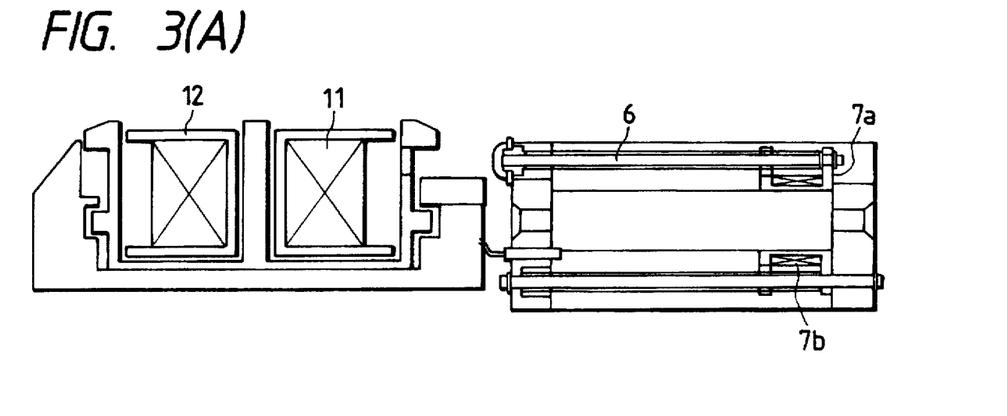
FIGS. 3(A), 3(B) and 3(C) show the positional relation between the bobbin of a sewing machine and the apparatus for detecting the residual quantity of bobbin thread, and the positional relation between bobbin thread wound on the bobbin and a coil assembly 7 and a detection rod 6.
Figure 3B:
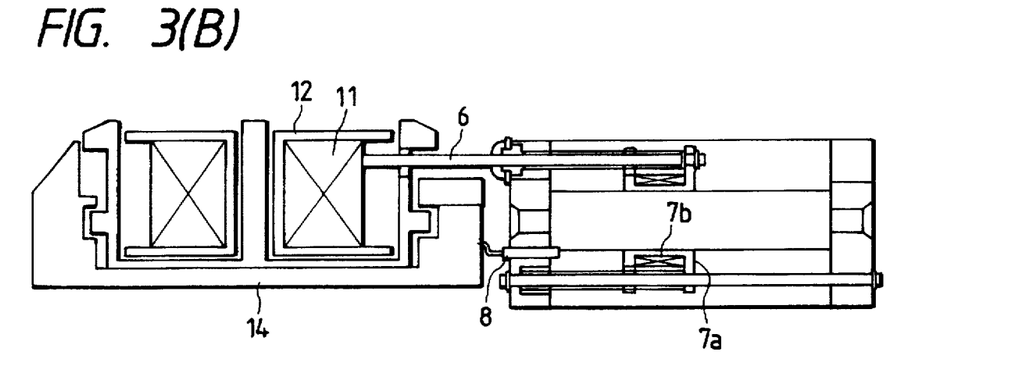
Figure 3C:
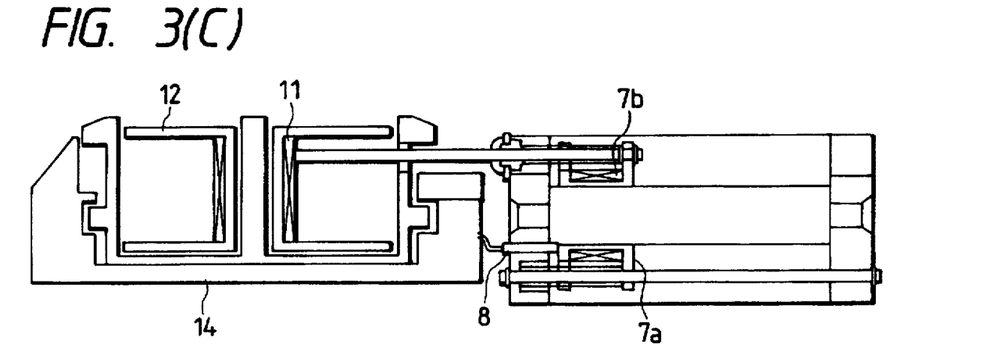

Furthermore, in FIGS. (3a–3c), reference numeral 11 designates bobbin thread to be wound on the bobbin in the lower part of the sewing machine, a bobbin 12, a permanent magnet 13 for sorting magnetic field distribution acting on the coil; and a shuttle (not shown) which has the built-in bobbin with the bobbin thread wound thereon and is also called the heart of a sewing machine.

Figure 12:
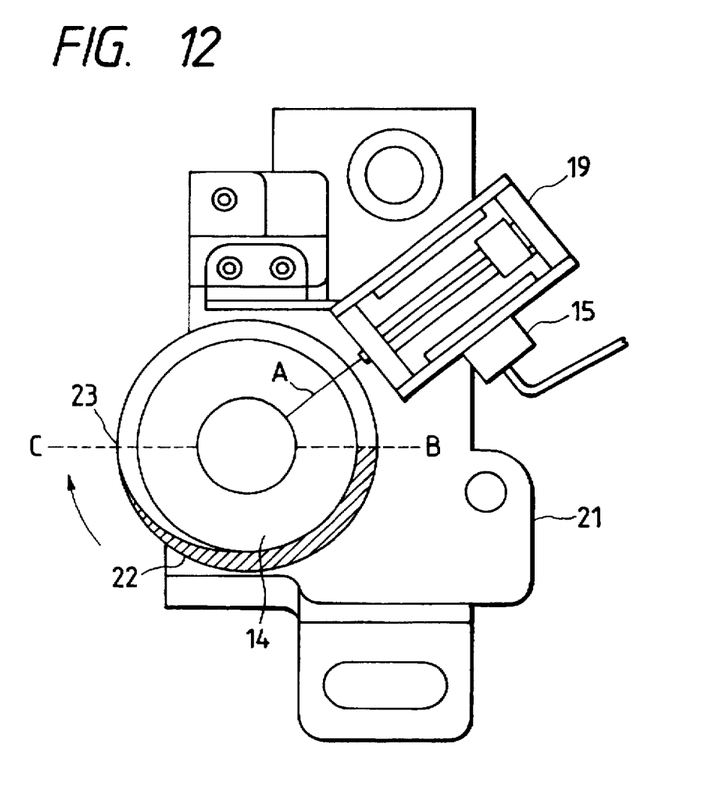
FIG. 12 is a schematic sectional view showing the positional relation between a linear actuator and a shuttle for containing bobbin thread.

According to this embodiment of the invention, a linear actuator 19 is arranged as shown in FIG. 12 in view of the limited space. The rotating hook 14 is made to turn twice each time the main shaft turns once in an ordinary sewing machine. Therefore, the detection rod is allowed to move forward into the bobbin thread shuttle within the range of 165°~255° and that of 345°~75°, that is, in the range of 90° in both cases in terms of an angle of rotation of the upper shaft (main shaft) of the sewing machine while staying away from the blade edge 23 and the over needle thread portion 22 of the rotating hook 14. The above angle range corresponds to the means as shown in FIG. 12, the advanced position A of the detection rod 6 due to the linear actuator is within 180° of B–C where the linear actuator is insertable into the rotating hook 14 up to a period of 50 m sec. when the upper shaft is rotating at 300 rpm. The linear actuator 19 according to this embodiment of the invention operates in less than 18 m sec. after it is driven until it is reset, since the mass of the moving portion, including the detection rod, is not greater than 2 g to ensure that even while the main shaft of the sewing machine is rotating at 300 rpm, the residual quantity of bobbin thread is detectable.

During the period in which the needle thread passes through the rotating hook is actually included in the angle of rotation ranging from 165°~255°, the needle thread is caught by the detection rod 6 when the actuator is operated during that period. Consequently, the actuator 19 is caused to operate when the main shaft is within the range of angles 345°~750°. Since the bobbin thread is paid out during that period, however, an ordinary solenoid tends to keep the detection rod in contact with the bobbin thread longer, thus creating problems. According to this embodiment of the invention, the mass of the operating unit is reduced so that the detection rod is retracted immediately after the detection of an oscillating wave is made occurring when the detection rod comes into contact the bobbin thread. It is therefore, possible to detect the residual quantity of bobbin thread even during the operation of the sewing machine without a degradation in sewing quality.

Figure 4A:
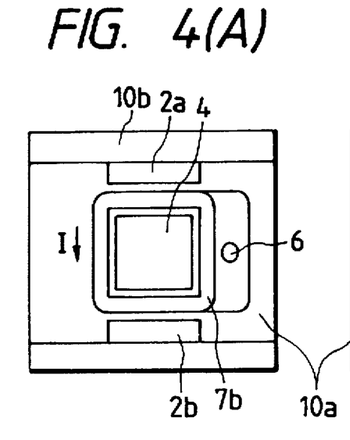
FIGS. 4(A) and (B) show a magnetic path in the apparatus therefor.
Figure 4B:
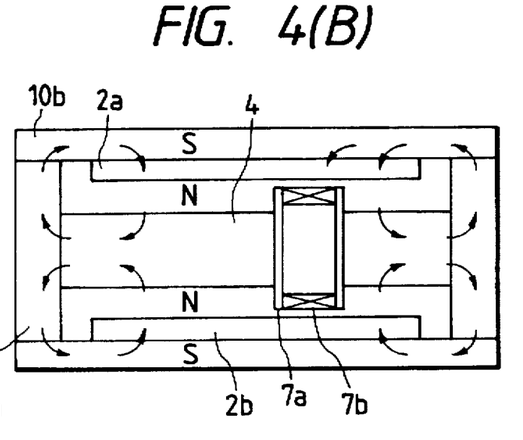

A description will now be given of the operation of the apparatus for detecting the residual quantity of bobbin thread by reference to FIGS. 4(A) and 4(B) illustrating a magnetic path.

With respect to the permanent magnet 2a, there is formed a magnetic path starting from N-pole of the permanent magnet 2a→gap 3a→iron core→yoke 10a→yoke 10b and the returning to S-pole of the permanent magnet 2a. With respect to the permanent magnet 2b, moreover, there is formed a magnetic path starting from N-pole of the permanent magnet 2b→gap 3b→iron core→yoke 10a→yoke 10b and the returning to S-pole of the permanent magnet 2b. Since the coil 7b is so arranged that it is freely slidable on the outer periphery of the iron core 4 in the gaps 3a, 3b, thrust generated by a current flowing through all 7b causes the coil 7b to move to the left of FIG. 4(B), in accordance with Fleming's left-hand rule due to when current flowing through the coil 7b in a counterclockwise direction. When current is made to flow through the coil 7b in a clockwise direction conversely, thrusting acting in the opposite direction is generated.

When considering just one permanent magnet, a thrusting force is generated in a direction opposite to that which acts on a coil from the N(or S)-pole-face facing the coil because the direction of the current is reversed on the coil side opposite to the iron core 4. However, the presence of the iron core in the center of the coil makes the magnetic flux density considerably lower as the iron core is set far from the permanent magnet, so that the thrust generated from the side facing the pole-face practically acts as driving force.

In the case of FIG. 3(A), a spring force generated by the return springs 5a, 5b, causes the coil assembly 7 to move to the rightmost end of the iron core 4 since no current is allowed to flow through the coil 7b in the initial condition.

In the case of FIG. 3(B), on the other hand, the coil assembly 7 starts sliding when the current for driving the coil assembly 7 to the left is made to flow while the amount of bobbin thread 11 wound on the bobbin 12 is sufficient. When the other end of the detection rod 6 with one end fixed to one end of the coil bobbin 7a contacts the bobbin thread 11, the coil assembly 7 stops moving, whereby the edge of the coil assembly 7 does not reach the pressure sensor 8 fixed to the left end of the apparatus for detecting the residual quantity of bobbin thread.

In the case of FIG. 3(C), the edge of the coil assembly 7 contacts the pressure sensor 8 fixed to the left end of the apparatus for detecting the residual quantity of bobbin thread before the other end of the detection rod 6 contacts the bobbin thread since the residual quantity of the bobbin thread wound on the bobbin 12 has decreased, whereby the coil assembly 7 stops sliding. By detecting the output signal of the pressure sensor 8, the detection device sends a stop signal to the sewing machine and informs the operator that the residual quantity of the bobbin thread has decreased to a level that requires replacing of the bobbin.

Although the pressure sensor has been employed as a sensor according to this embodiment of the invention, the position of the coil assembly 7 may be detected by a magnetic sensor, an optical sensor, an oscillating-wave detection element (an ultrasonic sensor, a shock sensor).

Since one end of the detection rod 6 is secured to the coil assembly 7, moreover, it is possible to detect the position of the projection provided on the outer peripheral face of the detection rod 6 electrically, magnetically or optically. Moreover, it is also possible to detect such a projection by means of a micro-switch through physical contact therewith.

Normally, current is made to flow through the coil assembly 7 in the forward direction and the coil assembly 7 is returned by the return spring to the initial position after the current is cut off. In this case, the spring constant of the return spring is set to 0.01 N/mm and the return spring primary function is totaled coil assembly 7 at the initial position. The coil assembly 7 may also be returned to the initial position by causing current to flow in a direction opposite to the forward direction for resetting purposes.

In the returning spring arrangement of the coil assembly 7 to its initial position, without causing current to flow in the opposite direction, the force of the return spring must be increased to shorten the reset time. In order for the coil assembly 7 to move forward against the spring force, the thrusting force applied to the coil also needs to increase.

Countermeasures to be taken to increase the thrusting force and problems arising therefrom are as follows:

(a) Increase in magnetic flux density in the gap . . . (Machine increase in size).

(b) Increase in the number of turns of coil . . . (Increases mass of the moving portion).

(c) Increase current flow . . . (Increase in heat generation).

These problems can be solved by reducing the spring return force, by causing current to flow through the coil in the reverse direction, and decreasing the weight of the moving portion. Thus the coil can be moved back and forth at a high speed.

Figure 5:
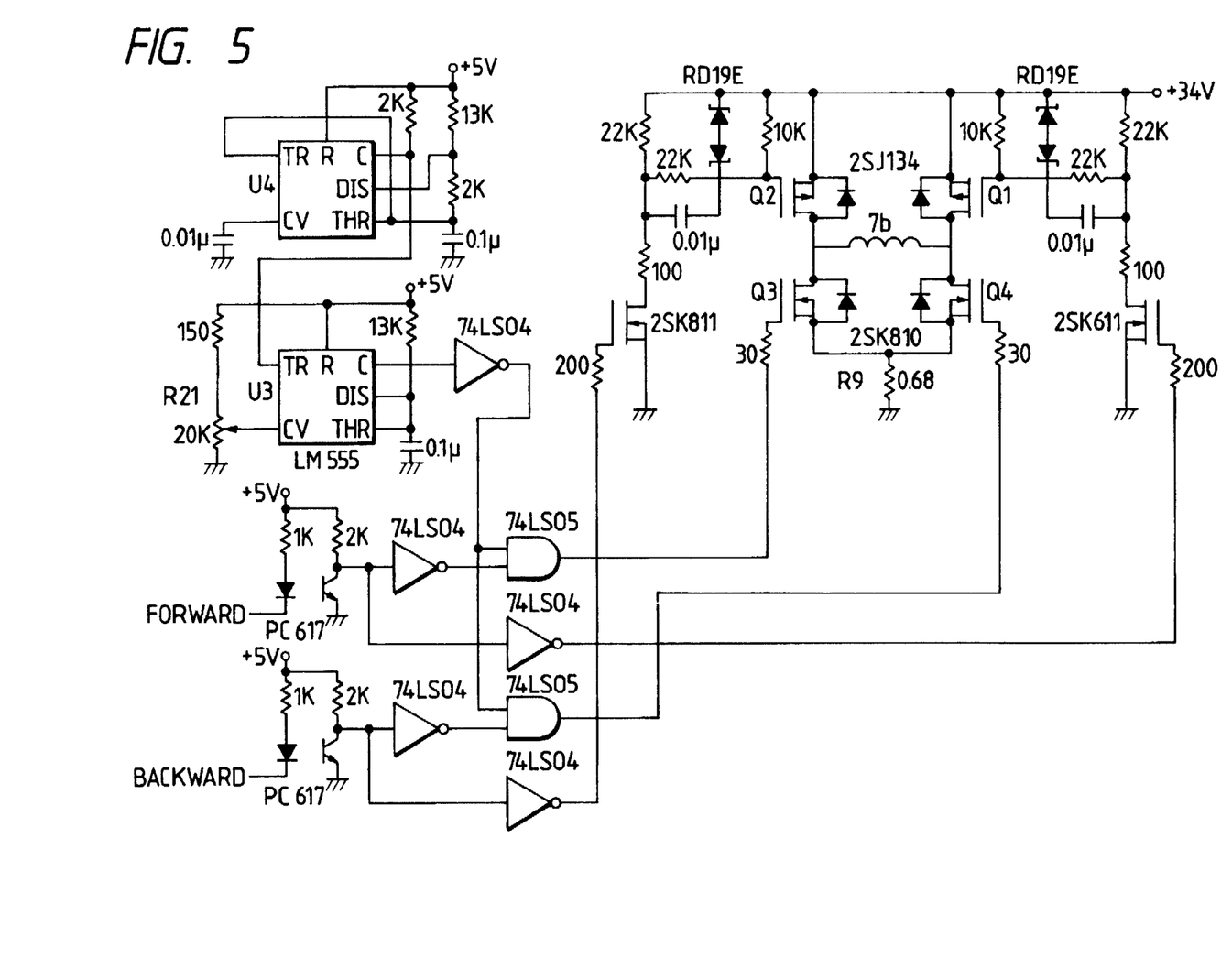
FIG. 5 is a coil-driving circuit diagram showing that current can be made to flow bidirectionally into a coil 7b in the apparatus therefor.

FIG. 5 is a coil-driving circuit diagram showing that current is made to flow bidirectionally in the coil 7b according to the present invention. While FORWARD and BACKWARD terminals are ON and OFF respectively, transistors Q1, Q3 are turned ON and current flows as follows: power supply→transistor Q1→coil 7b→transistor Q3→resistor R9 →the earth. While FORWARD and BACKWARD terminals are OFF and ON respectively, on the other hand, transistors Q2, Q4 are turned ON and current flows like this: power supply→transistor Q2→coil 7b→transistor Q4→resistor R9→the earth. In other words, the current is made to flow through the coil 7b forward or backward by controlling terminal voltage, and the thrust is applied to the coil assembly 7 in the forward or backward direction.

Moreover, the current flowing through the coil 7b is made controllable by turning ON/OFF the transistor Q3 or Q4 in FIG. 5. More specifically, the thrust applied to the coil assembly 7 can be reduced by causing the current for generating the thrust in the direction in which the coil assembly moves forward or backward to flow intermittently into a conductor capable of supplying electricity to the coil assembly that is freely slidable on the periphery of the iron core 4. According to the embodiment of the present invention shown in FIG. 5, monostable multi-vibrators U3, U4 are disposed to serve as a frequency modulation circuit, and a variable resistor R21 is used to regulate the resistance value, whereby ON/OFF frequencies are made variable. Therefore, the mean current value can be regulated so as to obtain a desired thrust by causing current to flow through the coil 7b intermittently.

Figure 1B:
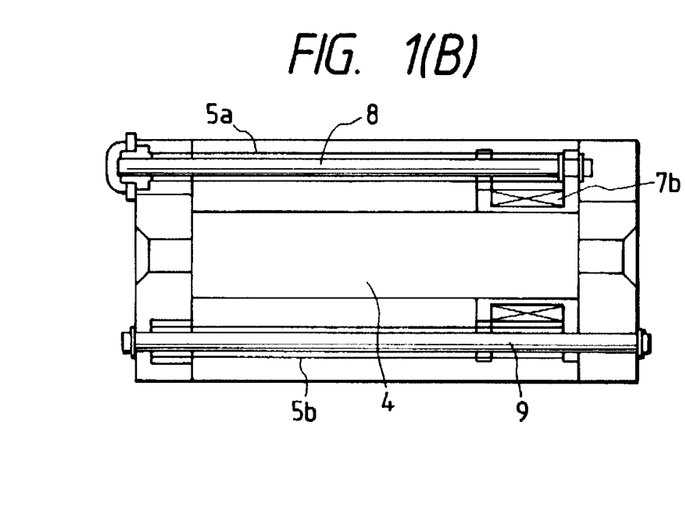
FIG. 1(B) is a vertical sectional view of the same.
Figure 1C:
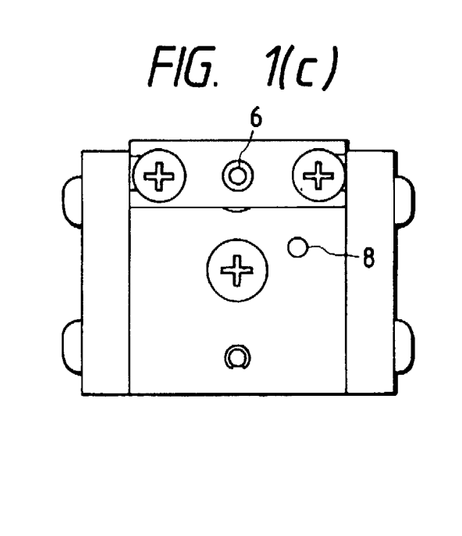
FIG. 1(C) is a left side view of the same.
Figure 2:
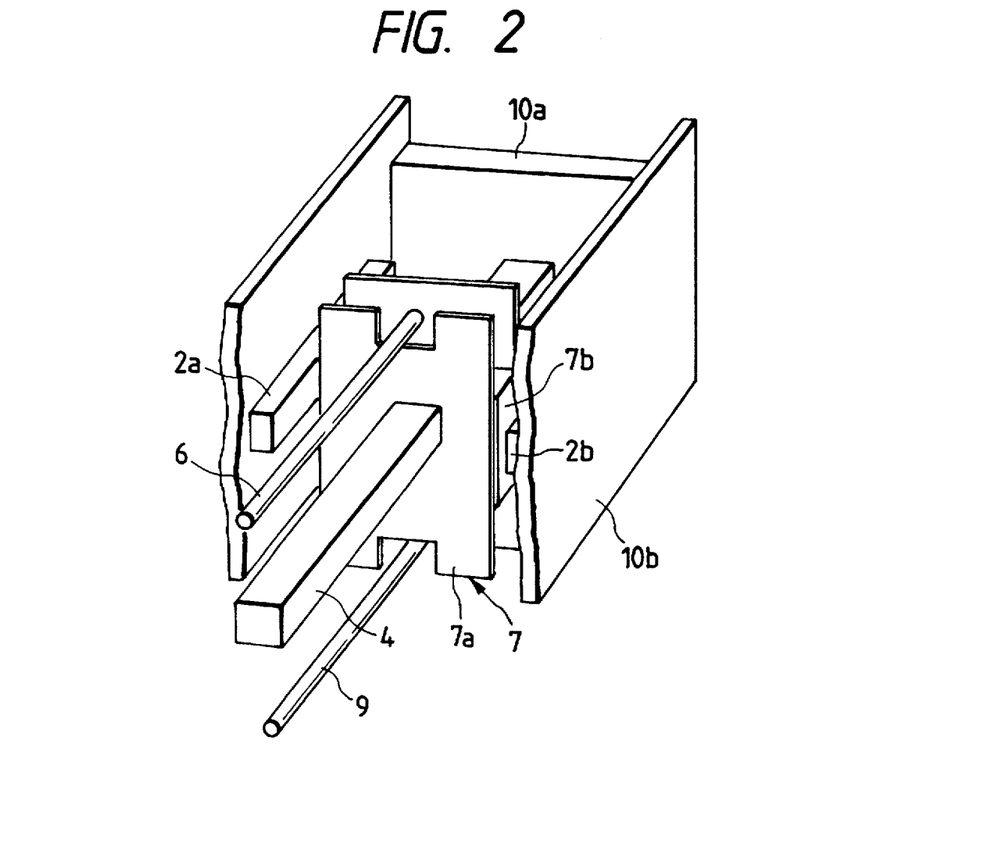
FIG. 2 is a partial exploded three-dimensional view of the principal part of the apparatus therefor.

Moreover, a cover is provided for the top and base of what is shown in FIGS. 1(A) to 1(C) according to the embodiment of the present invention to hermetically seal it ensuring stable operation of the sewing machine is achieved without being affected by the lubrication oil of the machine and waste thread.

Although the yokes 10a, 10b have been shown FIG. 1(A) as those forming not only the magnetic flux path but the outer frame of the apparatus for detecting the residual quantity of bobbin thread, the yokes may be formed into a unitary body.

Although a description has been given of the apparatus for detecting the residual quantity of bobbin thread using the operating principle of the linear d.c. motor including two permanent magnets according to the first embodiment of the invention, the present invention is not limited to the embodiment thereof.

The linear d.c. motor is usually based on the operating principle of the rotary d.c. motor, and structural contrivance has been made to make linear thrusting available.

Figure 6A:
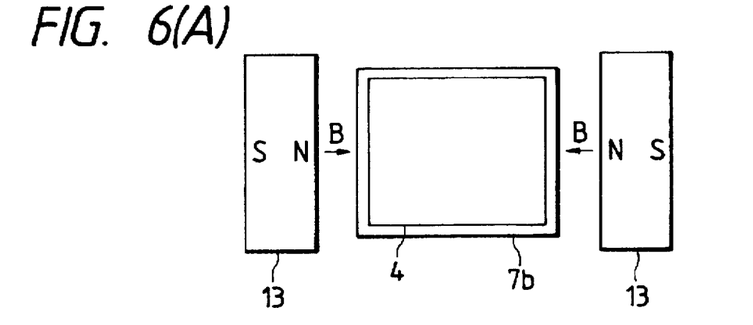
FIGS. 6(A), 6(B) and 6(C) is a diagram showing a magnetic field classification in accordance with the distribution of a magnetic field acting on the coil of a linear d.c. motor.
Figure 6B:
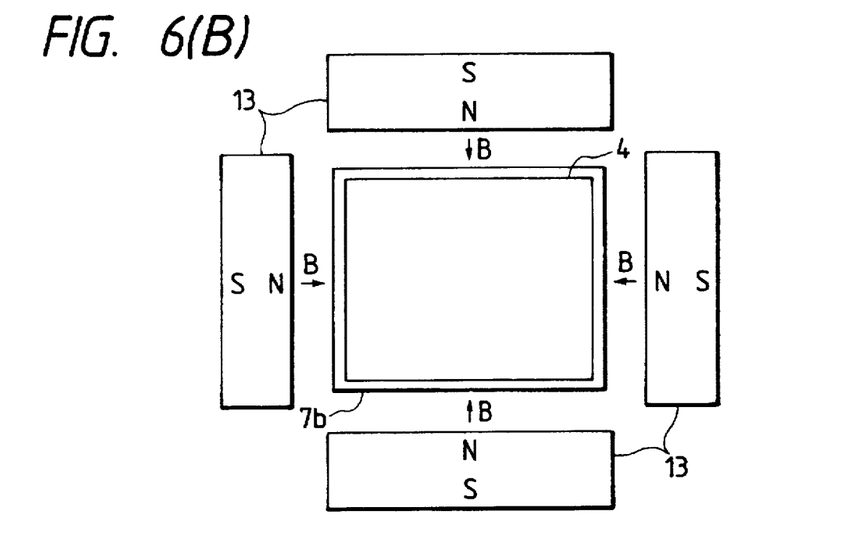
Figure 6C:
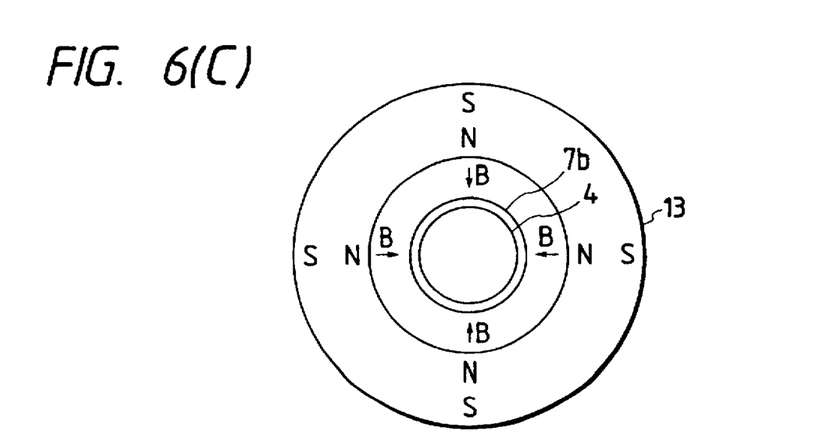

FIGS. 6(A) to 6(C) show a magnetic field classification in accordance with the distribution of a magnetic field acting on the coil of the linear d.c. motor: generally speaking, (A) non-uniform magnetic field type; (B) semi-uniform magnetic field type; and (C) uniform magnetic field type.

Although (A), (B) and (C) partially differ in shape, they are all permanent magnets denoted by reference numeral 13, like reference numerals 4 and 7b of FIG. 1(A) each designate an iron core and a coil.

The non-uniform magnetic field type of FIG. 6(A) includes, as in the embodiment of the present invention of FIG. 1(A), two permanent magnets 13, and magnetic flux density B acts on only two sides of the coil. As the semimagnetic field type of FIG. 6(B) includes four permanent magnets, the magnetic flux density B acts on the four sides of the coil however, this is not of perfectly uniform. The uniform magnetic field type of FIG. 6(C) employs a cylindrical permanent magnet 13, whereby the magnetic flux density B uniformly acts on the coil.

The present invention is applicable equally, by not solely too (A) non-uniform magnetic field types (B) semiuniform magnetic field types and (C) uniform magnetic field types. The point is that the iron core 4 is set opposite to the permanent magnets and that the permanent magnets are arranged so that the same pole-face (N- or S-pole) is directed to the iron core.

Although the pressure sensor has been used as a sensor, a description has also been provided where the position of the coil assembly 7 can be detected by an oscillating-wave detection element.

The use of such an oscillating-wave detection element, unlike that of the pressure sensor, the magnetic sensor and so on, allows the coil assembly 7 to perform a full-stroke operation, which results in making the oscillating wave colliding with the side different in waveform and level from the oscillating wave at the time the bobbin thread is left. Moreover, the output waveform of the oscillating-wave detection element varies between a case in which the coil assembly hits against the front wall as it moves forward and another case where it hits against the rear wall as it resets on account of the distance between the sensor and the wall surface. The construction of the apparatus for detecting the residual quantity of bobbin thread and the like. Consequently, one or a plurality of oscillating-wave detection elements are used to secure confirmation of the detection of the residual quantity of bobbin thread and the movement of the coil assembly by employing two kinds or more than two kinds, if necessary, of comparators whose reference voltages are different.

Figure 7:
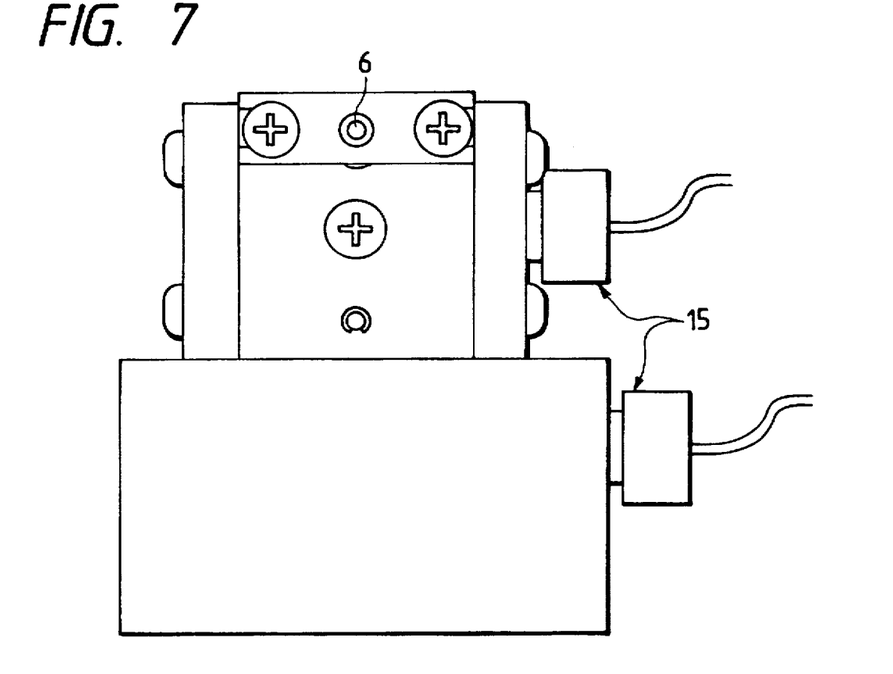
FIG. 7 is a side view showing that an oscillating-wave detection element as a sensor is packaged in the fixing part of the apparatus for detecting the residual quantity of bobbin thread or a fixing member to which the apparatus is fitted.

FIG. 7 is a side view showing that an oscillating-wave detection element 15 (an ultrasonic sensor, a shock sensor, etc.) as a sensor is secured to the fixing part of the apparatus for detecting the residual quantity of bobbin thread or a fixing member to which the apparatus is fitted. As shown in FIG. 7, two ultrasonic sensors are each packaged in the fixing part of the apparatus for detecting the residual quantity of bobbin thread and the fixing member to which the apparatus is fitted; however, this drawing is intended to simplify the illustration and actually the number of sensors to be installed may be one.

Figure 8:
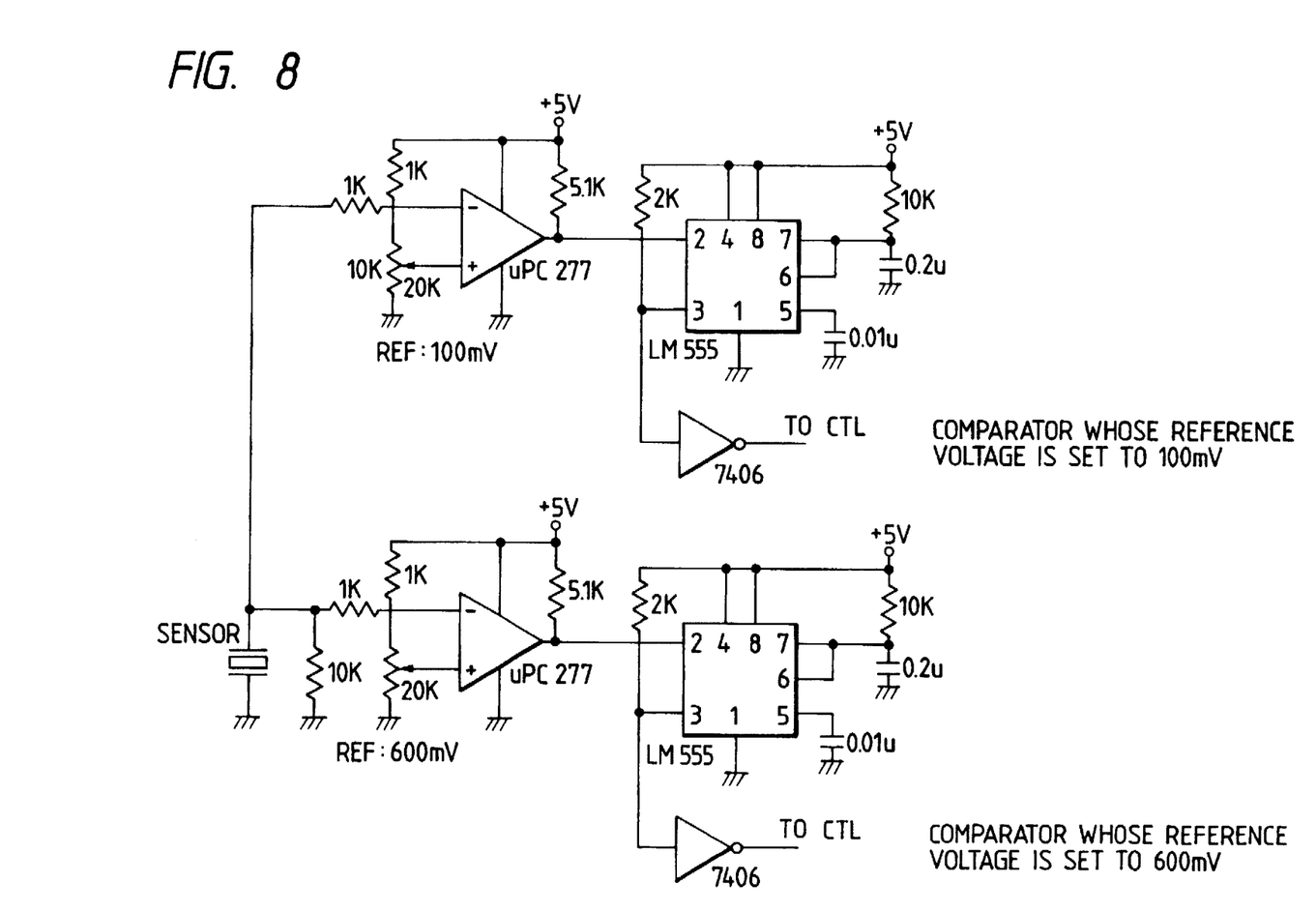
FIG. 8 is an oscillating-wave discrimination circuit diagram using the oscillating-wave detection element as a sensor.

FIG. 8 is an oscillating-wave discrimination circuit using two kinds of comparators according to the present invention. In this case, there are shown a comparator whose reference voltage is set to 100 mV and another comparator whose reference voltage is set to 600 mV and besides an output from the ultrasonic sensor is connected to the other input terminal of the latter. The outputs of the comparators are each connected to the inputs of different monostable multi-vibrators (one shot) LM555, and a decision circuit (not shown) discriminates one shot output.

Figure 9:
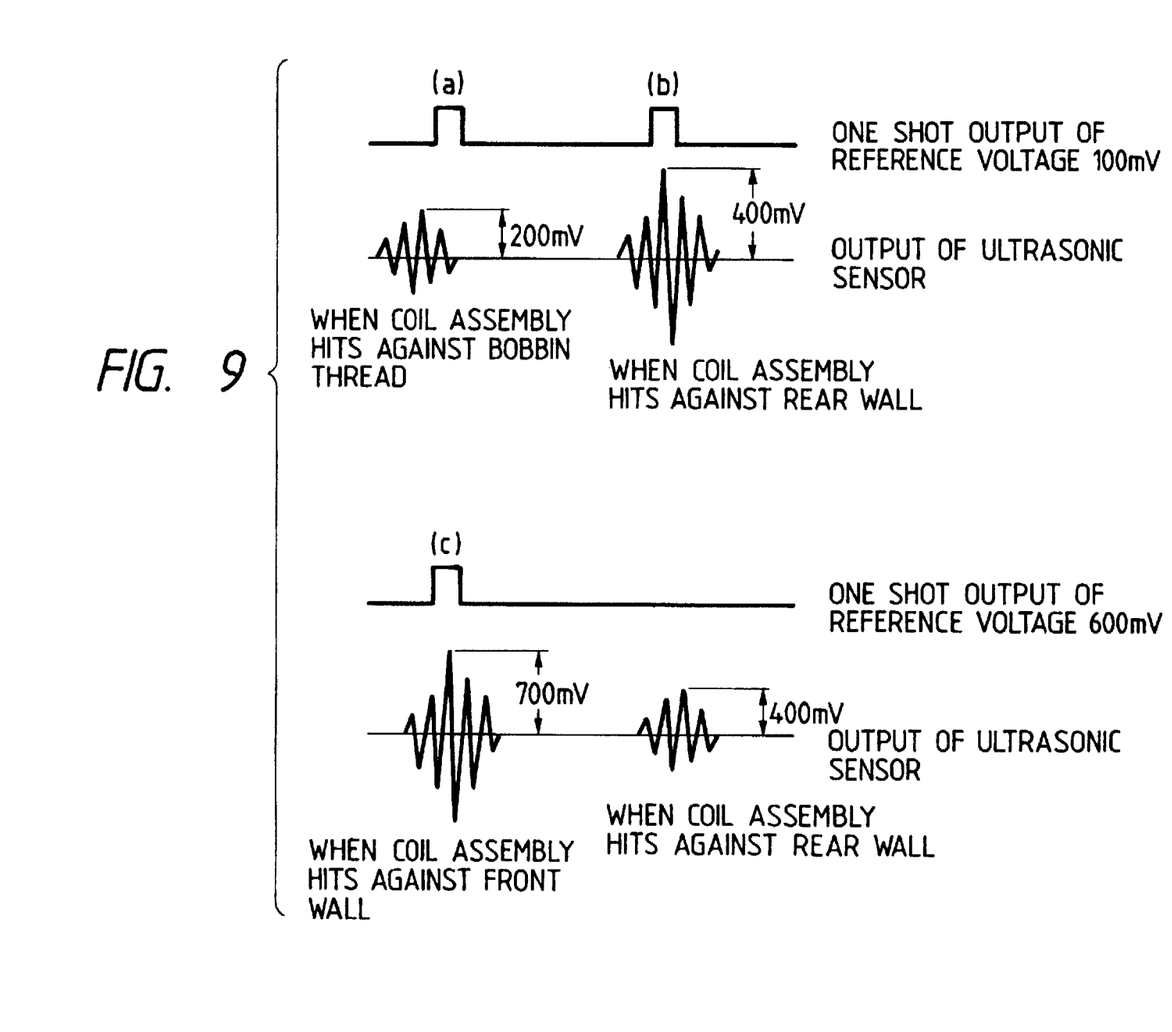
FIG. 9 is an output waveform chart showing one shots of the sensor of FIG. 8.

The ultrasonic sensor detects the oscillating wave against which the moving portion has hit. FIG. 9 shows two comparators whose reference voltages are different, and output waveforms of two one shots when the output of the ultrasonic sensor is input to the oscillating-wave discrimination circuit of FIG. 8.

As shown in FIG. 9, only one shot on the side where the reference voltage has been set to 100 mV sends out an output pulse with reference to the oscillating waves generated when the detection rod hits against the bobbin thread as it moves forward ((a) of FIG. 9), and when the coil assembly resets and hits against the rear wall ((b) of FIG. 9).

When the bobbin thread decreases, one shot where the reference voltage has been set to 100 mV and one shot where the reference voltage has been set to 600 mV both output an output pulse (c) of FIG. 9 since the oscillating wave generated when the coil assembly moves forward and hits against the front wall reaches a maximum value of 700 mv.

The presence or absence of bobbin thread and whether the moving portion moves back and forth properly can be identified by a single oscillating-wave detection element by combining the presence or absence of the outputs of these two one shots with control over the forward movement and resetting of the coil assembly.

According to the above embodiment of the invention, the voltage value of the oscillating wave when the coil assembly or the detection rod collides with the wall and the bobbin thread has been used to identify the condition of the bobbin thread. However, it is possible to decide that the residual quantity of the bobbin thread has become smaller than a predetermined quantity by analyzing the frequency of the oscillating wave.

More specifically, an oscillating wave having a low frequency and a small amplitude is generated when the residual quantity of the bobbin thread becomes greater than the predetermined quantity because the leading end of the detection rod 6 contacts the outer periphery of the bobbin thread, and an oscillating wave having a high frequency and a large amplitude is generated when the residual quantity of the bobbin thread becomes smaller than the predetermined quantity because the coil assembly moves forward and collides with the front wall. Therefore, FFT (Fast Fourier Transform), for example, is used to analyze the frequency of the oscillating wave detected by the sensor, so that the presence or absence of the residual quantity of the bobbin thread is detected by determining from the frequency characteristics obtained thereby what has caused the oscillating wave thus detected to vary. In this case, the presence or absence of the residual quantity of the bobbin thread may be detected by combining the frequency analysis with the size (quantity) of the amplitude of the oscillating wave.

Figure 10:
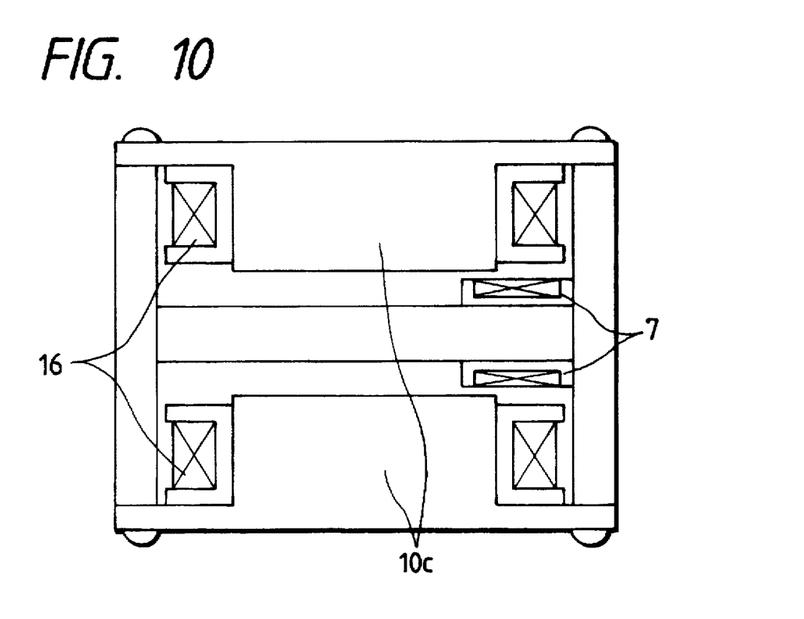
FIG. 10 is a schematic diagram illustrating an apparatus for detecting the residual quantity of bobbin thread for generating magnetic flux using an iron core and electromagnets in place of permanent magnets.

Although a description has been given of the use of permanent magnets as means for generating magnetic flux until now, similar magnetic flux can be generated by using electromagnets, each of which includes an electromagnetic coil and an electromagnetic iron core. FIG. 10 is a schematic diagram illustrating an arrangement for driving the coil assembly 7 by means of electromagnets. By controlling the direction of current flowing through the two electromagnetic coils 16 wound aroud the bobbin portion 10c of the yoke 10 shown in FIG. 10, magnetic flux having magnetic poles similar to those of permanent magnets can be generated.

Figure 11:
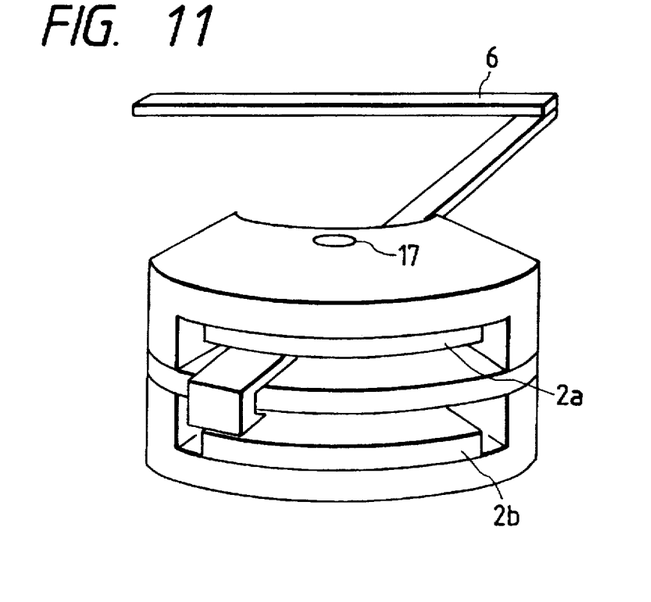
FIG. 11 is a schematic diagram of the principal part of a pivotal movable coil type actuator in which a coil assembly is movable in the form of a circular arc with respect to a rotary central shaft.

FIG. 11 is a schematic diagram of the principal part of a rotatable movable coil type actuator formed with a movable coil type actuator in which the coil assembly 7 moves on a plane in the form of a circular arc with respect to a rotary central shaft 17.

In this case, the operation of the movable coil type actuator need not necessarily be linear. Moreover, the directions in which the movable coil type actuator and the detection rod 6 need not necessarily be conformable to each other.

According to the present invention, the detection-rod 6 is driven to move forward and one end of the detection rod 6 contacts the bobbin thread wound on the bobbin 12 via the opening of the shuttle which is at a standstill, rotating or rocking, whereby the residual quantity of the bobbin thread is measured. However, the opening of the shuttle needs to be kept continuously open until the detection rod 6 measures the residual quantity of the bobbin thread, that is, until the detection rod 6 completely moves backward after moving forward via the opening of the shuttle to examine the residual quantity of the bobbin thread wound on the bobbin 12. To measure the residual quantity of the bobbin thread in the rotating shuttle in particular, it is necessary to contrive the following: the detection rod 6 is controlled so that it can be moved back and forth at high speed; the position of the opening of the shuttle has been made known accurately; the rotational velocity of the shuttle has also been made known; and the opening of the shuttle has been widened in the direction in which the shuttle is rotated.

In brief, it is essential to minimize a time interval until the detection rod 6 moves forward and then completely moves backward after it passes through the opening of the shuttle during the rotation of the shuttle.

The actuator as described in this embodiment of the invention includes every electromagnetic means for transforming electric signals into physical movements, the means including solenoids, plunger electromagnets, general motors and the like, to say nothing of the coil assembly 7 as embodied according to the present invention and the movable coil type actuator as a higher concept.

Although a description has been given of the apparatus for detecting the residual quantity of bobbin thread for a sewing machine according to this embodiment of the invention, an object of the sort fulfilled with reference to the seventh aspect is achievable likewise by applying the present invention to any other machine to be disposed in a narrow space of such as a printing unit like a printer hammer, a paper or part feeder, a mechanism utilizable in a vehicle and a robot, to say nothing of every unit of a sewing machine including a thread cutter placed under the thread plate of a sewing machine, a thread clearer disposed near a needle bar moving up and down, and an automatic needle-thread paying device (or called a stitch balancing device) forming a thread holder.

As set forth above in detail, the apparatus for detecting the residual quantity of bobbin thread allows the residual quantity of the bobbin thread by inserting the detection rod within the shuttle even during the time the sewing machine is in operation. Since no link mechanism is used, the apparatus therefor is small-sized and lightweight, and the apparatus for detecting the residual quantity of bobbin thread is readily be accommodated in the sewing machine. According to this embodiment of the invention, the coil assembly can be slid for more than 20 mm when it is supplied with electricity and the mass of the actuating portion weighs 2 grams or less; thus the bobbin thread is least affected thereby. As the actuating portion can respond within several tens of seconds, the residual quantity of the bobbin thread becomes detectable during the time the sewing machine is not only at a standstill but also in operation. Thus work efficiency as well as productivity is improved and the commercial value of the sewn product is prevented from being lowered because of the absence of bobbin thread during the sewing operation.

According to the present invention, error detection due to lubrication oil and waste thread is minimized in comparison with an optical system since the residual quantity of the bobbin thread is directly and physically detected by the detection rod, so that the residual quantity is detectable with accuracy and reliability even though the detection apparatus is used for a long period of time.

The apparatus for detecting the residual quantity of bobbin thread according to the third aspect makes it feasible to measure both the forward and backward movements of the detection rod as the direction of the current made to flow through the coil is controllable in the forward and backward directions both.

The apparatus for detecting the residual quantity of bobbin thread of the fourth aspect is capable of minimizing the influence originated from the collision of the other end of the detection rod with the outer periphery of the bobbin thread wound on the bobbin by intermittently causing current to flow through the coil assembly by varying the effective current value. Moreover, the time constant is decreased by increasing the voltage applied to the coil, whereby the time required for the coil to move can be shortened. The time required for the coil is thus shortened to the extent that high-speed measurement is made possible.

The apparatus for detecting the residual quantity of bobbin thread of the fifth aspect is capable of detecting the residual quantity of the bobbin thread by detecting the oscillating wave generated when the moving portion moves to and hits against the solid portion and discriminating the oscillating wave then. The apparatus therefor is also capable of detecting the presence or absence of the bobbin thread and whether or not the forward and backward movements of the moving portion have properly been carried out by discriminating the output signal of the oscillating-wave detection means in terms of the size of the oscillating wave generated when the moving portion moves to and hits against the solid portion.

The apparatus for detecting the residual quantity of bobbin thread of the sixth aspect is capable of detecting the presence or absence of the bobbin thread or whether or not the forward and backward movements of the moving portion have properly been carried out by analyzing the frequency of the oscillating wave generated when the moving portion moves to and hits against the solid portion.

The detection apparatus of the seventh aspect is capable of detecting the operation of the moving element of the actuator, that is, whether or not the mechanism actuated by the actuator operates properly with the effect of attaining the detection of the operation thereof by locating only a single ultrasonic sensor close to the actuator.

What is claimed is:

1. An apparatus for detecting whether the amount of residual thread remaining on a bobbin for a sewing machine is less than a predetermined amount when a shuttle containing the bobbin is located at a specific phase position, said apparatus comprising:
   a solenoid having an iron core and a moveable portion linearly slideably moveable along said iron core in response to application of electrical current to said solenoid;
   a detection rod fixed to said moveable portion and having one end contacting the outer periphery of the bobbin thread wound on the bobbin to measure the residual quantity of the bobbin thread;
   a power supply for supplying current to said solenoid to move said moveable portion and said detection rod.

2. An apparatus for detecting whether the amount of residual thread remaining on a bobbin for a sewing machine is less than a predetermined amount when a shuttle containing the bobbin is located at a specific phase position, said apparatus comprising:
   a magnet generating magnetic fields having a first pole-face side and a second pole-face side;
   an iron core facing said first pole-face side of said magnet;
   a yoke for magnetically coupling said second pole face side of said magnet to said iron core;
   a moveable actuator positioned in a gap between said magnet and said iron core, including coils of conductors wound around said iron core to supply electricity, and being freely slideable on the outer periphery of said iron core in a direction parallel to said first pole-face side of said magnet;
   a detection rod driven when force acts thereon as said movable actuator slides, said detection rod having one end in contact with the outer periphery of the bobbin thread wound on the bobbin to measure the residual quantity of the bobbin thread; and
   a power supply for supplying current to said coils to let said movable actuator have thrust.

3. An apparatus as claimed in either claim 2, wherein said power supply supplies:
   a forward current for providing said coils thrust in a direction in which said coils move forward; and
   a backward current for providing said coils thrust in a direction in which said coils move backward.

4. An apparatus according to claim 1, further comprising:
   controlling means for controlling the thrust of said solenoid by intermittently stopping current from said power supply.

5. An apparatus for detecting whether the amount of residual thread remaining on a bobbin for a sewing machine is less than a predetermined amount when a shuttle containing the bobbin is located at a specific phase position, said apparatus comprising:
   a solenoid having a moveable portion moveable in response to application of electrical current to said solenoid;
   a detection rod fixed to said moveable portion and having one end contacting the outer periphery of the bobbin thread wound on the bobbin to measure the residual quantity of the bobbin thread; and
   a power supply for supplying current to said solenoid to move said moveable portion and said detection rod;
   wherein said solenoid includes a magnet generating magnetic fields having a first pole-face side and a second pole-face side, an iron core facing said first pole-face side of said magnet, and a yoke for magnetically coupling said second pole face side of said magnet to said iron core; and
   said moveable portion is positioned in a gap between said magnet and said iron core, includes coils of conductors wound around said iron core to supply electricity, and is freely slideable on the outer periphery of said iron core in a direction parallel to said first pole-face side of said magnet.

6. An apparatus for detecting whether the amount of residual thread remaining on a bobbin for a sewing machine is less than a predetermined amount when a shuttle containing the bobbin is located at a specific phase position, said apparatus comprising:
   a solenoid having a moveable portion moveable in response to application of electrical current to said solenoid;

a detection rod fixed to said moveable portion and having one end contacting the outer periphery of the bobbin thread wound on the bobbin to measure the residual quantity of the bobbin thread; and a power supply for supplying current to said solenoid to move said moveable portion and said detection rod;

wherein said moveable portion is moveable along a predetermined linear path;

said detection rod has one end moveable through a range of motion bounded at one end by a fully extended position, said rod end contacting the outer periphery of the bobbin thread wound on the bobbin before reaching said fully extended position when the residual quantity of the bobbin thread is greater than said predetermined amount; and a sensor detecting when said rod end reaches said fully extended position and generating an output indicating that the residual quantity of the bobbin thread is less than the predetermined amount.

7. A method for detecting when the residual quantity of bobbin thread wound on a bobbin for a sewing machine is less than a predetermined amount, comprising the steps of:

disposing adjacent the bobbin a solenoid having an iron core and a moveable portion linearly slideably moveable along said iron core in response to application of electrical current to said solenoid, said moveable portion having fixed thereto a detecting rod, said rod being moveable along a predetermined linear path toward and away from said bobbin with one end of said rod moving through a range of motion bound at one end by a fully extended position, said rod end contacting the outer periphery of the bobbin thread wound on the bobbin before reaching said fully extended position when the residual quantity of the bobbin thread is greater than said predetermined amount.

disposing a sensor for operable engagement with said rod when said rod end reaches said fully extended position;

activating the solenoid to urge said rod end toward the outer surface of the residual thread;

detecting engagement of said rod with said sensor when said thread is less than said predetermined quantity and said rod therefore reaches said fully extended position and engages said sensor.

* * * * *